(12) United States Patent
Dahan et al.

(10) Patent No.: US 11,012,492 B1
(45) Date of Patent: May 18, 2021

(54) HUMAN ACTIVITY DETECTION IN COMPUTING DEVICE TRANSMISSIONS

(71) Applicant: PALO ALTO NETWORKS (ISRAEL ANALYTICS) LTD., Tel Aviv (IL)

(72) Inventors: Asaf Dahan, Tel Aviv (IL); Rony Brailovsky, Tel Aviv (IL); Yaron Neuman, Zoran (IL); Idan Amit, Ramat Gan (IL); Yinnon Meshi, Kibbutz Revivim (IL)

(73) Assignee: PALO ALTO NETWORKS (ISRAEL ANALYTICS) LTD., Tel Aviv (IL)

( * ) Notice: Subject to any disclaimer, the term of this patent is extended or adjusted under 35 U.S.C. 154(b) by 0 days.

(21) Appl. No.: 16/726,985

(22) Filed: Dec. 26, 2019

(51) Int. Cl.
  *H04L 29/08* (2006.01)
  *H04L 29/06* (2006.01)

(52) U.S. Cl.
  CPC .............. *H04L 67/02* (2013.01); *H04L 63/08* (2013.01); *H04L 63/12* (2013.01); *H04L 63/20* (2013.01); *H04L 67/10* (2013.01); *H04L 67/16* (2013.01)

(58) Field of Classification Search
  CPC ......... H04L 67/02; H04L 63/08; H04L 63/12; H04L 63/20; H04L 67/10; H04L 67/16
  USPC ......................................................... 709/203
  See application file for complete search history.

(56) References Cited

U.S. PATENT DOCUMENTS

| | | | |
|---|---|---|---|
| 5,991,881 A | 11/1999 | Conklin et al. | |
| 6,347,374 B1 | 2/2002 | Drake et al. | |
| 7,178,164 B1 | 2/2007 | Bonnes | |
| 7,225,343 B1 | 5/2007 | Honig et al. | |
| 7,694,150 B1 | 4/2010 | Kirby | |
| 7,703,138 B2 | 4/2010 | Desai et al. | |
| 7,752,665 B1 | 7/2010 | Robertson et al. | |
| 8,077,849 B2 * | 12/2011 | Altberg | H04L 65/4007 379/201.01 |
| 8,429,180 B1 | 4/2013 | Sobel et al. | |

(Continued)

FOREIGN PATENT DOCUMENTS

| | | |
|---|---|---|
| EP | 0952521 A2 | 10/1999 |
| EP | 2056559 A1 | 5/2009 |

OTHER PUBLICATIONS

Light Cyber Ltd, "LightCyber Magna", pp. 1-3, 2011.

(Continued)

*Primary Examiner* — David P Zarka
(74) *Attorney, Agent, or Firm* — Kligler & Associates Patent Attorneys Ltd

(57) ABSTRACT

Methods, apparatus and computer software products implement embodiments of the present invention that include protecting a computing system by defining a list of network access messages that are indicative of human use of computing devices, and extracting, from data traffic transmitted over a data network connecting a plurality of the computing devices to multiple Internet sites, respective transmissions from the computing devices to the Internet sites. A given transmission including one of the network access messages in the list is detected in the transmissions from a given computing device, and the given computing device is classified as being operated by a human in response to detecting the given transmission. Upon identifying suspicious content in the transmissions from a subset of the computing devices that includes the given computing device, any suspicious transmissions from the given computing device are ignored in response to the classification.

28 Claims, 3 Drawing Sheets

(56) References Cited

U.S. PATENT DOCUMENTS

| | | | |
|---|---|---|---|
| 8,490,190 B1 | 7/2013 | Hernacki et al. | |
| 8,555,388 B1 | 10/2013 | Wang et al. | |
| 8,677,487 B2 | 3/2014 | Balupari et al. | |
| 8,898,137 B1* | 11/2014 | Brundage | G06F 16/95 707/708 |
| 8,925,095 B2 | 12/2014 | Herz et al. | |
| 8,966,625 B1 | 2/2015 | Zuk et al. | |
| 9,038,178 B1 | 5/2015 | Lin | |
| 9,049,244 B2* | 6/2015 | Prince | H04L 61/2007 |
| 9,147,071 B2 | 9/2015 | Sallam | |
| 9,342,691 B2 | 5/2016 | Maestas | |
| 9,356,941 B1* | 5/2016 | Kislyuk | H04L 63/14 |
| 9,378,361 B1 | 6/2016 | Yen et al. | |
| 9,386,028 B2 | 7/2016 | Altman | |
| 9,420,049 B1* | 8/2016 | Talmor | H04L 63/1416 |
| 9,753,968 B1 | 9/2017 | Ronen et al. | |
| 9,781,160 B1* | 10/2017 | Irimie | H04L 63/1491 |
| 9,898,755 B2* | 2/2018 | McLaughlin | G06Q 30/0201 |
| 9,900,301 B2* | 2/2018 | Yanacek | H04L 63/0281 |
| 9,979,739 B2 | 5/2018 | Mumcuoglu et al. | |
| 10,069,852 B2* | 9/2018 | Turgeman | G01R 29/26 |
| 10,075,461 B2 | 9/2018 | Mumcuoglu et al. | |
| 10,230,718 B2* | 3/2019 | Idika | G06F 21/31 |
| 10,325,084 B1* | 6/2019 | Larimer | H04L 63/0876 |
| 10,326,789 B1* | 6/2019 | Vines | H04L 67/02 |
| 10,326,790 B2* | 6/2019 | Mattson | G06F 21/554 |
| 10,375,046 B1* | 8/2019 | Samvelian | H04L 63/08 |
| 10,630,707 B1* | 4/2020 | Oren | H04L 63/168 |
| 10,686,829 B2* | 6/2020 | Amit | G06F 21/554 |
| 2003/0110396 A1 | 6/2003 | Lewis et al. | |
| 2004/0117658 A1 | 6/2004 | Klaes | |
| 2004/0210769 A1 | 10/2004 | Radatti et al. | |
| 2004/0250169 A1 | 12/2004 | Takemori et al. | |
| 2004/0260733 A1 | 12/2004 | Adelstein et al. | |
| 2005/0262560 A1 | 11/2005 | Gassoway | |
| 2005/0268112 A1 | 12/2005 | Wang et al. | |
| 2006/0018466 A1 | 1/2006 | Adelstein et al. | |
| 2006/0075462 A1 | 4/2006 | Golan | |
| 2006/0075492 A1 | 4/2006 | Golan et al. | |
| 2006/0075500 A1 | 4/2006 | Bertman et al. | |
| 2006/0136720 A1 | 6/2006 | Armstrong et al. | |
| 2006/0149848 A1 | 7/2006 | Shay | |
| 2006/0161984 A1 | 7/2006 | Phillips et al. | |
| 2006/0191010 A1 | 8/2006 | Benjamin | |
| 2006/0282893 A1 | 12/2006 | Wu et al. | |
| 2007/0072661 A1 | 3/2007 | Lototski | |
| 2007/0214088 A1 | 9/2007 | Graham et al. | |
| 2007/0218874 A1 | 9/2007 | Sinha et al. | |
| 2007/0226796 A1 | 9/2007 | Gilbert et al. | |
| 2007/0283166 A1 | 12/2007 | Yami et al. | |
| 2008/0005782 A1 | 1/2008 | Aziz | |
| 2008/0016339 A1 | 1/2008 | Shukla | |
| 2008/0016570 A1 | 1/2008 | Capalik | |
| 2008/0104046 A1 | 5/2008 | Singla et al. | |
| 2008/0104703 A1 | 5/2008 | Rihn et al. | |
| 2008/0134296 A1 | 6/2008 | Amitai et al. | |
| 2008/0198005 A1 | 8/2008 | Schulak et al. | |
| 2008/0271143 A1 | 10/2008 | Stephens et al. | |
| 2009/0007100 A1 | 1/2009 | Field et al. | |
| 2009/0007220 A1 | 1/2009 | Ormazabal et al. | |
| 2009/0157574 A1 | 6/2009 | Lee | |
| 2009/0182701 A1 | 7/2009 | Berger et al. | |
| 2009/0320136 A1 | 12/2009 | Lambert et al. | |
| 2010/0107257 A1 | 4/2010 | Ollmann | |
| 2010/0162400 A1 | 6/2010 | Feeney et al. | |
| 2010/0197318 A1 | 8/2010 | Petersen et al. | |
| 2010/0212013 A1 | 8/2010 | Kim et al. | |
| 2010/0217861 A1 | 8/2010 | Wu | |
| 2010/0268818 A1 | 10/2010 | Richmond et al. | |
| 2010/0278054 A1 | 11/2010 | Dighe | |
| 2010/0299430 A1 | 11/2010 | Powers et al. | |
| 2011/0131652 A1* | 6/2011 | Robinson | H04L 63/1408 726/22 |
| 2011/0153748 A1 | 6/2011 | Lee et al. | |
| 2011/0185421 A1 | 7/2011 | Wittenstein et al. | |
| 2011/0214187 A1 | 9/2011 | Wittenstein et al. | |
| 2011/0225650 A1 | 9/2011 | Margolies et al. | |
| 2011/0247071 A1 | 10/2011 | Hooks et al. | |
| 2011/0265011 A1 | 10/2011 | Taylor et al. | |
| 2011/0270957 A1 | 11/2011 | Phan et al. | |
| 2011/0302653 A1 | 12/2011 | Frantz et al. | |
| 2011/0321175 A1 | 12/2011 | Slater | |
| 2012/0079596 A1 | 3/2012 | Thomas et al. | |
| 2012/0102359 A1 | 4/2012 | Hooks | |
| 2012/0136802 A1 | 5/2012 | McQuade et al. | |
| 2012/0137342 A1 | 5/2012 | Hartrell et al. | |
| 2012/0143650 A1 | 6/2012 | Crowley et al. | |
| 2012/0191660 A1 | 7/2012 | Hoog | |
| 2012/0222120 A1 | 8/2012 | Rim et al. | |
| 2012/0233311 A1 | 9/2012 | Parker et al. | |
| 2012/0275505 A1* | 11/2012 | Tzannes et al. | |
| 2012/0331553 A1 | 12/2012 | Aziz et al. | |
| 2013/0097103 A1 | 4/2013 | Chari et al. | |
| 2013/0097706 A1 | 4/2013 | Titonis et al. | |
| 2013/0111211 A1 | 5/2013 | Winslow et al. | |
| 2013/0132149 A1* | 5/2013 | Wei | G05B 23/0281 705/7.28 |
| 2013/0196549 A1 | 8/2013 | Sorani | |
| 2013/0298243 A1 | 11/2013 | Kumar et al. | |
| 2014/0165207 A1 | 6/2014 | Engel et al. | |
| 2014/0196115 A1 | 7/2014 | Pelykh | |
| 2014/0325643 A1 | 10/2014 | Bart et al. | |
| 2015/0040219 A1 | 2/2015 | Garraway et al. | |
| 2015/0047032 A1 | 2/2015 | Hannis et al. | |
| 2015/0121461 A1 | 4/2015 | Dulkin et al. | |
| 2015/0156214 A1* | 6/2015 | Kaminsky | G06Q 30/0248 726/22 |
| 2015/0195300 A1 | 7/2015 | Adjaoute | |
| 2015/0200821 A1 | 7/2015 | Sade et al. | |
| 2015/0264069 A1 | 9/2015 | Beauchesne et al. | |
| 2015/0286819 A1 | 10/2015 | Coden et al. | |
| 2015/0304346 A1 | 10/2015 | Kim | |
| 2015/0319185 A1 | 11/2015 | Kirti et al. | |
| 2015/0373039 A1 | 12/2015 | Wang | |
| 2016/0191918 A1 | 6/2016 | Lai et al. | |
| 2016/0294846 A1* | 10/2016 | Sharov | H04L 63/126 |
| 2016/0306965 A1 | 10/2016 | Iyer et al. | |
| 2016/0315954 A1 | 10/2016 | Peterson et al. | |
| 2016/0330235 A1* | 11/2016 | Thompson | G06F 21/44 |
| 2017/0026391 A1 | 1/2017 | Abu-Nimeh | |
| 2017/0185758 A1* | 6/2017 | Oliker | G06F 21/316 |
| 2017/0192946 A1* | 7/2017 | Beezer | G06F 3/0482 |
| 2017/0359306 A1 | 12/2017 | Thomas et al. | |
| 2018/0183819 A1 | 6/2018 | Le | |
| 2019/0102351 A1* | 4/2019 | Wu | H04L 67/22 |
| 2019/0164086 A1* | 5/2019 | Amit | H04L 63/1466 |
| 2019/0340622 A1* | 11/2019 | Azoulay | G06Q 30/016 |
| 2019/0373057 A1* | 12/2019 | He | H04L 67/2842 |
| 2020/0193009 A1* | 6/2020 | Shafet | G06F 21/36 |
| 2020/0228565 A1* | 7/2020 | Reverte | H04L 63/0263 |

OTHER PUBLICATIONS

Tier-3 Pty Ltd, "Huntsman Protector 360", Brochure, pp. 1-2, Apr. 1, 2010.

Tier-3 Pty Ltd, "Huntsman 5.7 The Power of 2", Brochure, pp. 1-2, Oct. 8, 2012.

Bilge et at., "Disclosure: Detecting Botnet Command and Control Servers Through Large-Scale NetFlow Analysis", ACSAC, pp. 1-10, Dec. 3-7, 2012.

Blum, "Combining Labeled and Unlabeled Data with Co-Training", Carnegie Mellon University, Research Showcase @ CMU, Computer Science Department, pp. 1-11, Jul. 1998.

Felegyhazi et al., "On the Potential of Proactive Domain Blacklisting", LEET'10 Proceedings of the 3rd USENIX Conference on Large-scale exploits and emergent threats, pp., 1-8, San Jose, USA, Apr. 27, 2010.

Frosch., "Mining DNS-related Data for Suspicious Features", Ruhr Universitat Bochum, Master'sThesis, pp. 1-88, Dec. 23, 2011.

Bilge at al., "Exposure: Finding Malicious Domains Using Passive DNS Analysis ", NDSS Symposium, pp. 1-17,Feb. 6-9, 2011.

(56) References Cited

OTHER PUBLICATIONS

Gross et al., "FIRE: Finding Rogue Networks", Annual Conference on Computer Security Applications (ACSAC'09), pp. 1-10, Dec. 7-11, 2009.

PA-3250 Next Generation Firewalls produced by Palo Alto Networks, pp. 1-2, year 2018.

Markowitz, N., "Bullet Proof Hosting: A Theoretical Model", Security Week, pp. 1-5, Jun. 29, 2010 downloaded from http://www.infosecisland.com/blogview/4487-Bullet-Proof-Hosting-A-Theoretical-Model.html.

Konte et al., "ASwatch: An AS Reputation System to Expose Bulletproof Hosting ASes", SIGCOMM, pp. 625-638, Aug. 17-21, 2015.

Markowitz, N., "Patterns of Use and Abuse with IP Addresses", Security Week, pp. 1-4 Jul. 10, 2010 downloaded from http://infosecisland.com/blogview/5068-Patterns-of-Use-and-Abuse-with-IP-Addresses.html.

Wei et al., "Identifying New Spam Domains by Hosting IPs: Improving Domain Blacklisting", Department of Computer and Information Sciences, University of Alabama at Birmingham, USA, pp. 1-8, Dec. 8, 2010.

Goncharov,M., "Criminal Hideouts for Lease: Bulletproof Hosting Services", Forward-Looking Threat Research (FTR) Team, A TrendLabsSM Research Paper, pp. 1-28, Jul. 3, 2015.

Shulman et al., "Top Ten Database Security Threats How to Mitigate the Most Significant Database Vulnerabilities", white paper, Imperva, Inc., pp. 1-14, year 2006.

"Use Spotlight on your Mac", pp. 1-3, Jul. 27, 2019 downloaded from https://supportapple.com/en-us/HT204014.

Niksun, "Network Intrusion Forensic System (NIFS) for Intrusion Detection and Advanced Post Incident Forensics", Whitepaper, pp. 1-12, Feb. 15, 2010.

International Application # PCT/IB2020/061128 Search Report dated Feb. 26, 2021.

\* cited by examiner

HUMAN ACTIVITY DETECTION IN COMPUTING DEVICE TRANSMISSIONS

FIELD OF THE INVENTION

The present invention relates generally to computer security and networks, and particularly to detecting a human operator of a computer on the network based on data transmissions from the computer.

BACKGROUND OF THE INVENTION

In many computers and network systems, multiple layers of security apparatus and software are deployed in order to detect and repel the ever-growing range of security threats. At the most basic level, computers use anti-virus software to prevent malicious software from running on the computer. At the network level, intrusion detection and prevention systems analyze and control network traffic to detect and prevent malware from spreading through the network.

The description above is presented as a general overview of related art in this field and should not be construed as an admission that any of the information it contains constitutes prior art against the present patent application.

SUMMARY OF THE INVENTION

There is provided, in accordance with an embodiment of the present invention, a method for protecting a computing device, including defining a list of network access messages that are indicative of human use of computing devices, extracting, from data traffic transmitted over a data network connecting a plurality of the computing devices to multiple Internet sites, respective transmissions from the computing devices to the Internet sites, detecting, in the transmissions from a given computing device, a given transmission including one of the network access messages in the list, classifying, in response to detecting the given transmission, the given computing device as being operated by a human, identifying, by a processor, suspicious content in the transmissions from a subset of the computing devices that includes the given computing device, and ignoring any suspicious transmissions from the given computing device in response to the classification.

In some embodiments, the given computing device includes a first given computing device, and the method also includes initiating a protective action for a second given computing device different from the first given computing device and in the subset of the computing devices.

In a first embodiment, a given network access message includes a user login request. In one embodiment, the user login request includes a user authentication request.

In a second embodiment, a given network access message includes a backup operation.

In a third embodiment, a given network access message includes a screen sharing operation.

In a fourth embodiment, a given network access message includes a network indexing operation.

In a fifth embodiment, a given network access message includes a first given computing device and wherein a given network access message includes a transmission to a software application executing on a second given computing device.

In a sixth embodiment, a given network access message includes a request for an IP address.

In a seventh embodiment, a given network access message includes a remote shell protocol.

In an eighth embodiment, a given network access message includes a first given computing device and wherein a given network access message includes a transmission to a second given computing device.

In a ninth embodiment, a given network access message includes a captive portal search.

In a tenth embodiment, a given network access message includes a domain request from a virtual assistant application executing on the given computing device.

In an eleventh embodiment, a given network access message includes a domain request from a desktop widget.

In a twelfth embodiment, a given network access message includes a domain request from a launching point.

In a thirteenth embodiment, a given network access message includes a media download or a live-stream request.

In a fourteenth embodiment, a given network access message includes a data synchronization request to a data cloud.

In a fifteenth embodiment, a given network access message includes a new access to a popular domain.

In a sixteenth embodiment, a given network access message includes user agent information.

In a seventeenth embodiment, a given network access message includes a favicon request.

In an eighteenth embodiment, a given network access message includes an indication that a new tab or window was opened or closed in a web browser executing on the given computing device.

In a nineteenth embodiment, a given network access message includes an HTTP referrer header.

In a twentieth embodiment, a given network access message includes a printing operation.

In a twenty first embodiment, a given network access message includes Wi-Fi activity.

In some embodiments, the web access messages include DNS requests having different DNS request types, and including determining a number of a given DNS request type in the web access messages from one of the computing devices to a domain, and classifying, based on the determined number, the one of the computing devices as being operated by a human.

In additional embodiments, the method also includes computing statistics on the web access messages from one of the computing devices to a domain, and classifying, based on the computed statistics, the one of the computing devices as being operated by a human.

In further embodiments, the data traffic includes data traffic transmitted over the data network during a specified time period. In supplemental embodiments, the time period includes a first time period, and the method also includes extracting, from additional data traffic transmitted over the data network during a second time period subsequent to the first time period, respective transmissions from the computing devices to the Internet sites, detecting, in the transmissions during the subsequent time period from the given computing device, a subsequent transmission including one of the network access messages in the list, and updating the classification, in response to detecting the subsequent transmission.

There is additionally provided, in accordance with an embodiment of the present invention, an apparatus for protecting a computing device, including a network interface card (NIC), and at least one processor configured to define a list of network access messages that are indicative of human use of computing devices, to extract, via the NIC from data traffic transmitted over a data network connecting a plurality of the computing devices to multiple Internet sites, respective transmissions from the computing devices to the Internet sites, to detect, in the transmissions from a given computing device, a given transmission including one of the network access messages in the list, to classify, in response to detecting the given transmission, the given computing device as being operated by a human, to identifying suspicious content in the transmissions from a subset of the computing devices that includes the given computing device, and to ignore any suspicious transmissions from the given computing device in response to the classification.

There is further provided, in accordance with an embodiment of the present invention, a computer software product for protecting a computing system, the product including a non-transitory computer-readable medium, in which program instructions are stored, which instructions, when read by a computer, cause the computer to define a list of network access messages that are indicative of human use of computing devices, to extract, from data traffic transmitted over a data network connecting a plurality of the computing devices to multiple Internet sites, respective transmissions from the computing devices to the Internet sites, to detect, in the transmissions from a given computing device, a given transmission including one of the network access messages in the list, to classify, in response to detecting the given transmission, the given computing device as being operated by a human, to identify suspicious content in the transmissions from a subset of the computing devices that includes the given computing device, and to ignore any suspicious transmissions from the given computing device in response to the classification.

BRIEF DESCRIPTION OF THE DRAWINGS

The disclosure is herein described, by way of example only, with reference to the accompanying drawings, wherein.

DETAILED DESCRIPTION OF EMBODIMENTS

Embodiments of the present invention provide methods and systems for monitoring data traffic transmitted over a data network comprising a plurality of computing devices and connected to multiple sites on the Internet so as to determine that a given computing device is generating the data traffic in response to input received from a human operator. Data traffic generated by a given computing device in response to human input (e.g., from a mouse or a keyboard) is typically considered to be less suspicious, since there is a lower probability that the data traffic was generated by a malware application executing on the given computing device.

As described hereinbelow, a list of network access messages that are indicative of human use of computing devices is defined, and respective transmissions from the computing devices to the Internet sites are extracted from data traffic transmitted over a data network. Upon detecting, in the transmissions from a given computing device, a given transmission comprising one of the network access messages in the list, the given computing device is classified as being operated by a human in response to detecting the given transmission. Upon identifying suspicious content in the transmissions from a subset of the computing devices that includes the given computing device, any suspicious transmissions from the given computing device can be ignored in response to the classification.

In one embodiment, as described supra, any suspicious transmissions from the given computing device can be ignored in response to the classification. In an alternative embodiment, the classification of the given computing device (i.e., indicating whether or not the given computing device is being operated by a human) can be used as an input to a classifier that analyzes the network traffic. For example, a classifier for detecting command and control (C&C) cyberattacks can use this classification to assist in determining whether or not a given computing device is infected with C&C malware.

System Description

Figure 1:
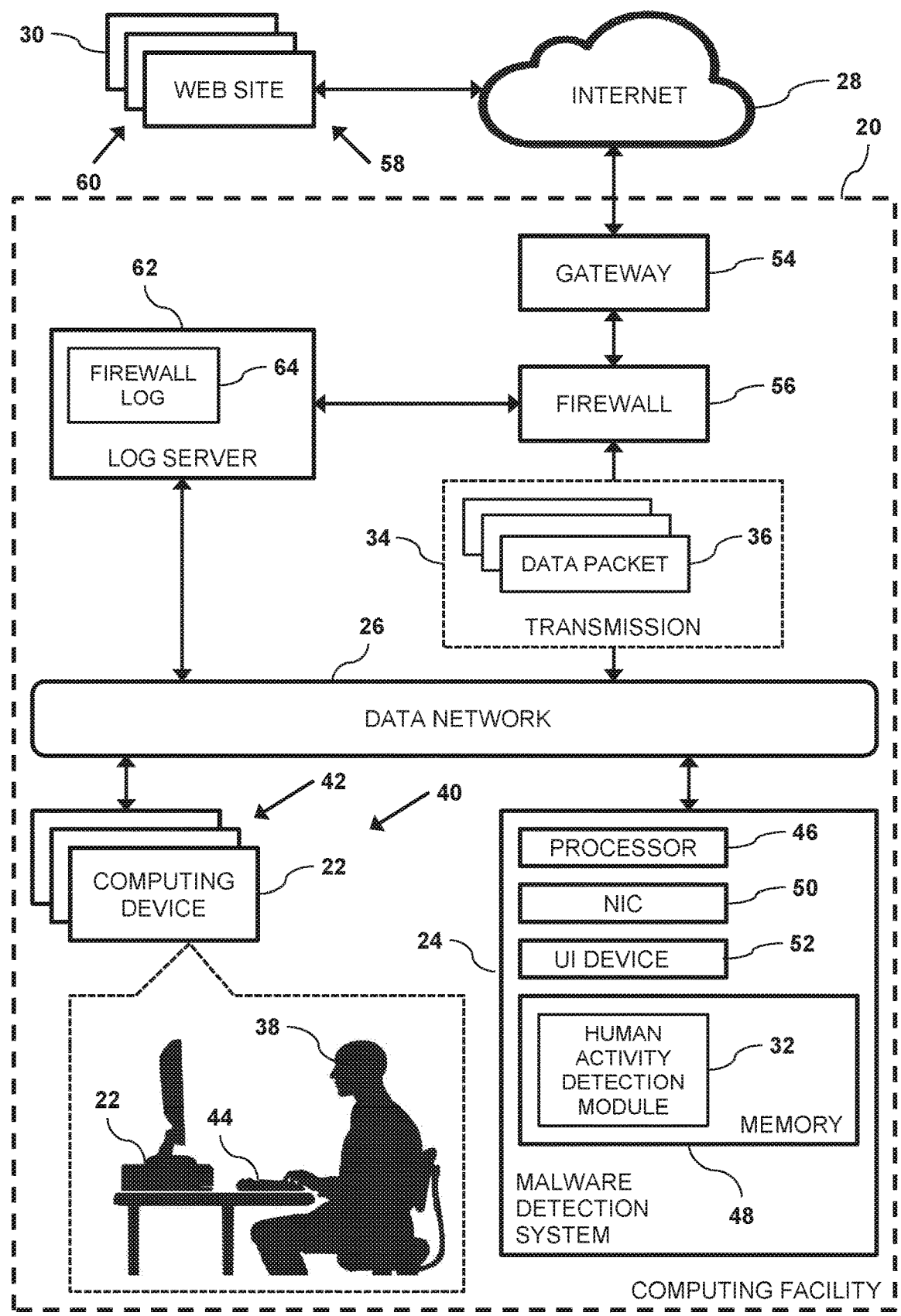
FIG. 1 is a block diagram that schematically shows a computing facility comprising multiple networked computing devices and a malware detection system comprising a human activity detection module, in accordance with an embodiment of the present invention.

FIG. 1 is a block diagram that schematically shows an example of a computing facility 20 comprising a plurality of computing devices 22 and a malware detection system 24 that communicate over a data network 26 (e.g., a local area network), in accordance with an embodiment of the present invention. In addition to communicating with each other, computing devices 22 may also communicate, via data network 26 and a public network 28 such as the Internet, with web sites 30. In embodiments described herein, malware detection system comprises a human activity detection module 32 that analyzes transmissions 34 comprising data packets 36 transmitted by each given computing device 22 so as to determine whether or not a given computing device is being operated by a human 38 (also referred to herein as a human operator 38).

Each computing device 22 may comprise any type of device (i.e., physical or virtual) that is configured to communicate over data network 26, and has an IP address assigned for this purpose. In embodiments of the present invention each given computing device 22 comprises a device identifier (ID) 40 and a device role 42. As described in the description referencing 2 hereinbelow, a given computing device 22 may comprise one or more input devices 44 that a given human 38 can use to operate the given computing device.

Examples of device IDs 40 include, but are not limited to, a media access control (MAC) addresses and Internet Protocol (IP) addresses that can be used to uniquely identify each of computing device 22. While at any given time, each given computing device 22 is assigned a unique IP address, the given computing device may be associated with multiple IP addresses over an extended time period. For example, the IP address for a given computing device 22 may change after a reboot of the given computing device.

Examples of roles 42 include, but are not limited to, servers (e.g., database servers, email servers and authentication servers), workstations, printers and routers (e.g., wireless routers).

In some embodiments, malware detection system 24 comprises a system processor 46 and a system memory 48, which are coupled by a system bus (not shown) to a network interface controller (NIC) 50 that couples the malware detection system to network 26. In some embodiments, malware detection system 24 may comprise a user interface (UI) device 52 (e.g., an LED display) or another type of output interface.

In operation, memory 48 can store human activity detection module 32, and processor 46 can analyze, using the human activity detection module, transmissions 34 from a given computing device 22 so as to determine whether or not a given human 38 is operating the given computing device. Human activity detection module 32 is described in the description referencing FIG. 3 hereinbelow.

In the configuration shown in FIG. 1, computing facility 20 may also comprise an Internet gateway 54 that couples computing facility 20 to Internet 28, and a firewall 56 that monitors and controls traffic (i.e., the flow of data packets 36) between network 26 and Internet 28 based on predetermined security rules. For example, firewall 56 can be configured to allow computing devices 22 to convey data requests to web sites 30, and to block data requests from the web sites to the computing devices. In additional embodiments, firewall 56 may be configured to monitor and control traffic between computing devices 22.

Each web site 30 has a corresponding domain 58 (i.e., a domain name) and a corresponding IP address 60. In embodiments described herein, a given transmission 34 has a source comprising a first given computing device 22 and a destination comprising a second given computing device 22 or a given web site 30. Therefore, a given transmission 34 from a first to a second given computing device 22 has source and destination device ID 40 (e.g., device IP addresses), and a given transmission from a given computing device 22 to a given web site 30 comprises a source device ID 40 and a destination IP address 60.

In some embodiments, firewall 56 can be configured to group data packets 36 according to the IP addresses (i.e., IDs and IP addresses 60) in the data packets, such that the system processor can group together data packets 36 having the same source and destination addresses or having the same source address, source port, destination address, destination port and protocol. Methods of grouping data packets 36 into transmissions 34 are described, for example, in U.S. Patent Application 2019/0164086.

As shown in FIG. 1, computing facility 20 may also comprise a log server 62 that is coupled to firewall 56 and network 26. Log server 62 is configured to receive, from firewall 56, details for each transmission 34, and to store the transmission details to a firewall log 64. In operation, malware detection system 24 can query firewall log 64, as described hereinbelow.

One example of a firewall 56 that can connect to log server 62 is the PA-3250 Next Generation Firewalls produced by Palo Alto Networks, Inc. of 3000 Tannery Way, Santa Clara, Calif. 95054 USA. Some examples of information that the firewall can store to log 64 include:

- customer_id: A unique ID for a customer (i.e., the entity managing the computing facility).
- receive_time: A time when the firewall received the log.
- time_generated: A time of a generated event (e.g., a given transmission 34).
- src: A source IP address in a given transmission 34.
- dst: A destination IP address in a given transmission 34.
- natsrc: A source MAC address in a given transmission 34.
- natdst: A destination MAC address in a given transmission 34.
- srcuser: A source username (if available) in a given transmission 34.
- dstuser: A destination username (if available) in a given transmission 34.
- app: An application ID for a given application 80 that originated a given transmission 34.
- sessionid: A unique ID for multiple packets 36 sent between two hosts in the same context.
- repeatcnt: A repeat count of a transmission of a given packet 36.
- sport: A source port in a given transmission 34.
- dport: A destination port in a given transmission 34.
- device_name: A device hostname (if it exists) in the packets of a given transmission 34.
- proto: A transmission protocol used (e.g., TCP, UDP or another low level protocol) in a given transmission 34.
- bytes_sent: A volume of traffic sent in a given transmission 34.
- bytes_received: A volume of traffic received in a given transmission 34.
- pkts_sent: A number of sent packets in a given transmission 34.
- pkts_received: A number of received packets in a given transmission 34.
- category: A category for a given application 80 that originated a given transmission 34.
- elapsed: A duration of the transmission of packets 36 for a given application 80 that originated a given transmission 34.

In some embodiments, the firewall can also store, to log 64, deep packet inspection (DPI) information that can be used to detect, in a given transmission 34, features such as a Secure Sockets Layer (SSL) session, a hypertext transfer protocol (HTTP) request, and a domain name system (DNS) request.

Figure 2:
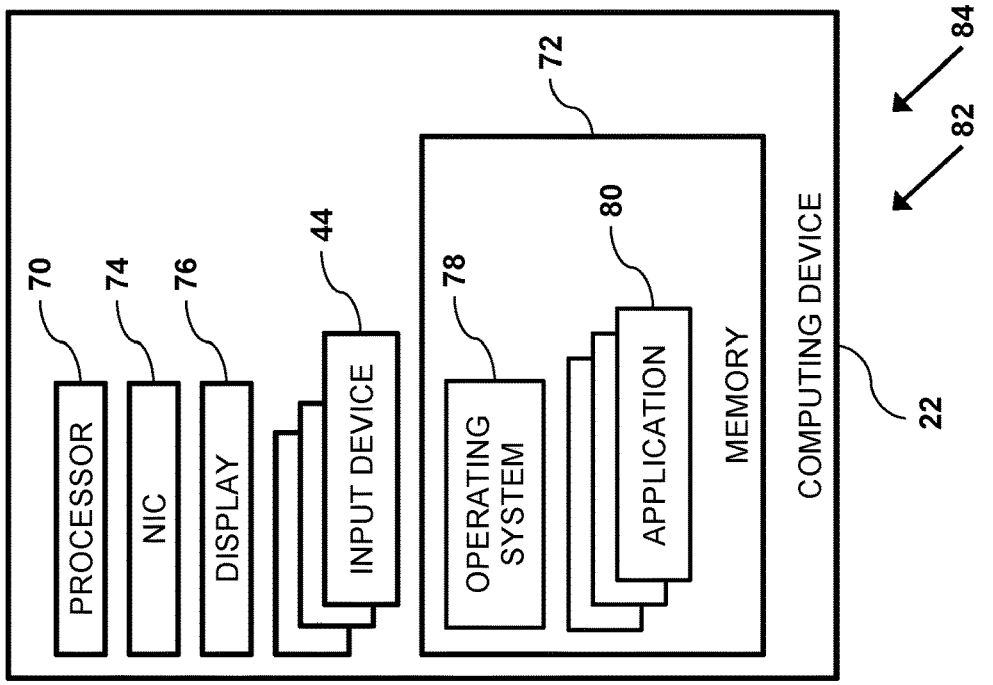
FIG. 2 is a block diagram of an example of a given computing device, in accordance with an embodiment of the present invention.

FIG. 2 is a block diagram showing hardware and software components of a given computing device 22, in accordance with an embodiment of the present invention. In the example shown in FIG. 2, a given computing device comprises a device processor 70, a device memory 72, a network interface controller (NIC) 74 that couples the given computing device to network 26, a display 76 (e.g., an LED monitor), and one or more physical input devices 44.

Examples of physical input devices 44 include, but are not limited to, keyboards, pointing devices (e.g., mice), microphones and cameras. In some embodiments, display 76 may comprise a touchscreen that accepts physical inputs from a given human operator 38.

In operation, processor 70 can execute, from memory 72, an operating system 78 and one or more software applications 8. Examples of operating systems 78 include, but are not limited to, MICROSOFT WINDOWS™ produced by MICROSOFT Corporation of One Microsoft Way, Redmond, Wash. 98052 USA, and MACOS™ produced by APPLE Inc. of One Apple Park Way, Cupertino, Calif. 95014 USA.

As described supra, examples of roles 42 include servers and workstations. If the role of a given computing device 22 is a workstation, then examples of applications 80 include, but are not limited to, word processing applications, spreadsheet applications, email clients and web browsers. If the role of a given computing device 22 is a server, then examples of applications 80 include, but are not limited to database servers and email servers.

In some embodiments, the computing devices may have corresponding malicious classifications 82 and corresponding operator classifications 84. For each given computing device 22, the malicious classification indicates whether or not the given computing device is engaged in malicious activity (e.g., due to malware detected by the malware detection system), and the operator classification indicates whether or not transmissions 34 from the given computing device indicate that there is a given human 38 operating the given computing device.

Figure 3:
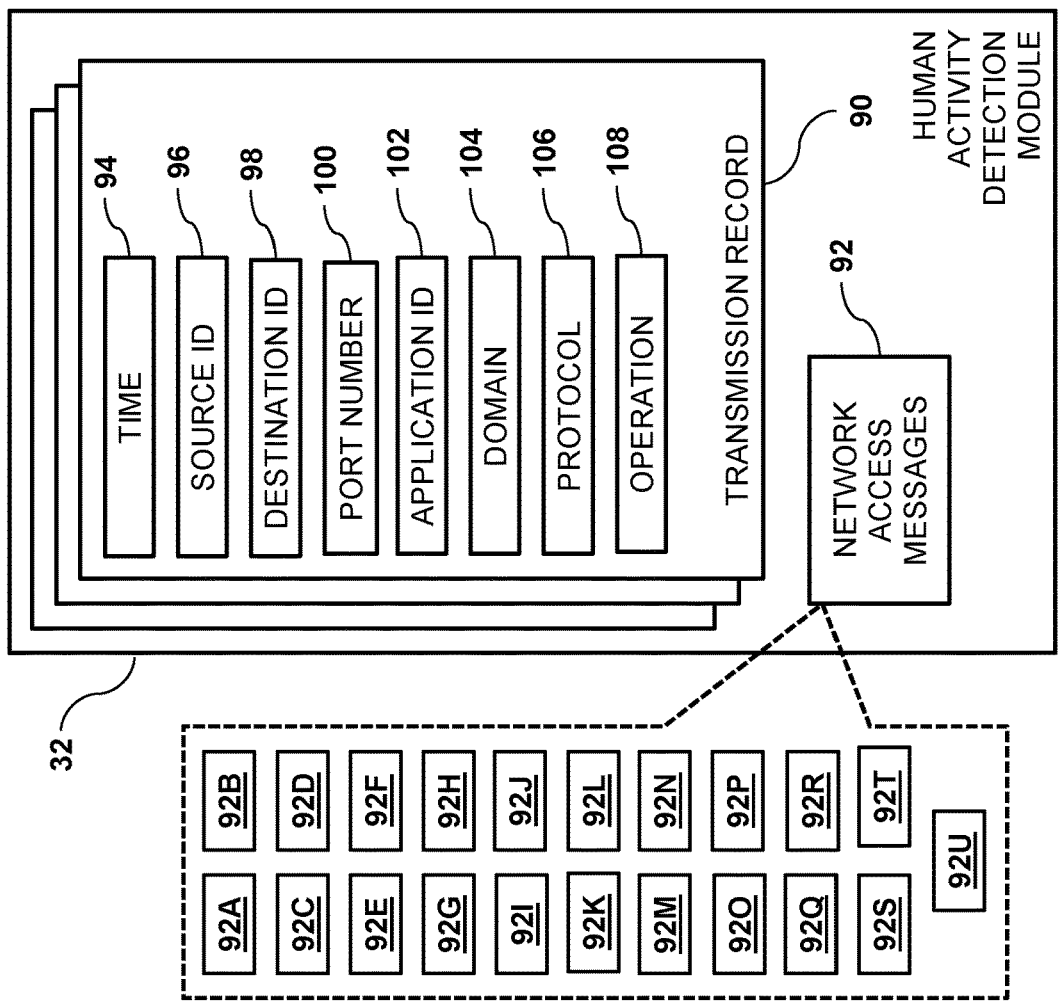
FIG. 3 is a block diagram of the human activity detection module, in accordance with an embodiment of the present invention.

FIG. 3 is a block diagram showing software components of human activity detection module 32, in accordance with an embodiment of the present invention. Human activity detection module 32 may comprise respective sets of transmission records 90 and network access messages 92.

In some embodiments, processor 46 can analyze each given transmission 34, generate a respective transmission record 90 for the given transmission (i.e., so that each of the transmissions has a corresponding transmission record), and populate the generated transmission record with the following information:

- A transmission time 94 indicating a date and a time of the given transmission.
- A source ID 96 indicating the device ID of a given computing device 22 that originated the given transmission.
- A destination ID 98 indicating a destination of the given transmission. If the destination comprises a second given computing device 22, then the destination ID may comprise the device ID of the second given computing device. If the destination comprises a given web site 30, then the destination ID may comprise the IP address of the given web site.
- A destination port number 100 indicating a destination port for the given transmissions.
- An application ID 102 that identifies the application that originated the given transmission on a given computing device 22. In instances where the operating system (or a component of the operating system) originated the given transmission on a given computing device 22, the application ID may comprise the operating system (or a component of the operating system). Examples of how processor 46 can identify a given application 80 or a given operating system that originated a given transmission 34 include, but are not limited to, identifying in the given transmission, a given domain 58, an application-specific signature, an application-specific protocol, an application-specific destination port, and a byte sequence in the packets of the given transmission that is application-specific.
- A requested domain 104 referencing a given domain 58 (i.e., if the given transmission includes the given domain).
- A protocol 106 used by the given transmission. Examples of protocols 106 include, but are not limited to, secure shell (SSH) protocols, network management protocols such as Dynamic Host Configuration Protocol (DHCP) and authentication protocols such as Kerberos, New Technology LAN Manager (NTLM), telnet, Hypertext Transfer Protocol (HTTP), Secure Sockets Layer (SSL), Domain Name System (DNS) and Microsoft's Remote Procedure Call (MSRPC). Examples of request types that use the Kerberos protocol include ticket granting service (TGS) and ticket granting ticket (TGT).
- A message operation 108 that indicate an operation performed using the given transmission. For example, a given operation 108 may comprise a login request or a media download request.

In some embodiments, processor 46 can classify a given computing device as being operated by a given human 38 if the message operation in a given transmission record 90 corresponding to a given transmission 34 matches a given network access message 92. In embodiments described herein, network access messages 92 can be differentiated by appending a letter to the identifying numeral, so that the network access messages comprise network access messages 92A-92U as follows:

Network access message 92A. This network access message comprises a given transmission 34 that includes a login request. The login request can be for a resource on network (e.g., an email server) or a resource on a given web site (e.g., a web based service such as MICROSOFT's WINDOWS LIVE™) having a respective domain 58.

In one example, processor 46 can determine that a given transmission 34 from a first computing device 22 comprises a login request if (a) there was no data traffic (e.g., data packets 36) transmitted by the first computing device during a specified time period (e.g., two hours) prior to the given transmission, (b) the destination ID of the given transmission comprises a second computing device 22 whose respective role is a domain controller, and (c) the protocol used by the given transmission comprises the Kerberos authentication protocol.

In another example, processor 46 can determine that a given transmission 34 from a given computing device 22 comprises a login request if (a) the destination for the given transmission comprises a given domain 104 that can be used for login activity (e.g., Microsoft's auth.gx.ms), and (b) the system processor did not detect any other transmissions 34 to the given domain during a time period (e.g., two hours) prior to the given transmission.

Network access message 92B. This network access message comprises a given transmission 34 that includes an authentication request for a resource on network 26. In a given transmission 34 comprising an authentication request, the destination ID may reference a given computing device 22 whose respective role 42 indicates that the given computing device is an authentication server (also known as a domain controller), or if the given transmission uses an authentication protocol (as described supra). In some embodiments, the authentication request may comprise a multi-factor authentication request for access to a given computing device 22 or a given web site 30 having domain 58.

Network access message 92C. This network access message comprises a given transmission 34 that includes a data backup operation. In a given transmission 34 comprising a backup operation, the destination ID may reference a given computing device 22 configured as a backup server, the application ID may reference a given application 80 that performs backup operations, or the protocol may indication a backup protocol such as Network Data Management Protocol (NDMP).

Network access message 92D. This network access message comprises a given transmission 34 that includes a screen sharing operation. In a given transmission 34 comprising a screen sharing operation, the application ID may reference a given application 80 that performs screen sharing, or the protocol may indication a screen sharing protocol such as remote desktop protocol (RDP).

Network access message 92E. This network access message comprises a given transmission 34 that includes a network indexing operation. In one embodiment, processor 46 can detect that a given network access message 92 comprises a network indexing operation by detecting that the application ID in the given transmission references a given application (e.g., SPOTLIGHT™ in MACOS™) that performs network indexing. In another embodiment, processor 46 can detect that given network access message 92 comprises a network indexing operation by detecting that the domain in the given transmission references a given domain 58 associated with network indexing.

For example, if a given computing device 22 presents a SPOTLIGHT™ search bar to a given human operator 38, and the given human operator inputs (e.g., via keyboard 44) a series of characters into the search bar, upon receiving each of the characters, the given computing device can automatically send an HTTPs request to cdn.smoot.apple.com (e.g., for auto completion suggestions).

Network access message 92F. This network access message comprises a given transmission 34 whose destination is a given application 80 (e.g., a server application such as a database server) executing on a given computing device indicated by the destination ID. In a given transmission 34 targeting a given application 80 executing on a given computing device 22, processor 46 can identify the given application based on the port number, and/or the application ID in the given transmission.

In one example, processor 46 can determine that a given transmission 34 from a first computing device 22 is using Microsoft Remote Display Protocol (MSRDP) to control a display of a second computing device 22 if (a) the port number in the given transmission is 3389, or (b) the application ID in the given transmission is "MS-RDP".

In another example, processor 46 can determine that a given transmission 34 comprises a printing operation if the application ID in the given transmission is "Print-Over-MS-SMB".

Network access message 92G. This network access message comprises a given transmission 34 that includes a request for an IP address. Processor 46 can identify a request for an IP in a given transmission 34 by analyzing the packets in the given transmission. In each of the packets transmitted over the network, processor 46 can identify the source and the destination IP addresses (i.e., that can be respectively stored to source ID 96 and destination ID 98) by the IPv4 or IPv6 protocol layer (in every protocol like DNS/SSH/HTTP there is a lower layer of IPv4/IPv6 in the packet that describes the source destination addresses).

Network access message 92H. This network access message comprises a given transmission 34 that includes a remote shell protocol (e.g., SSH) in protocol 106.

Network access message 92I. This network access message comprises a given transmission 34 whose destination is a given computing device 22 on network 34. In one embodiment, if the role of the given computing device is a printer, then the given transmission may comprise a printing operation. Processor 46 can also detect printing operations based on the application ID and/or the protocol in the transmission record corresponding to the given transmission.

In another embodiment, processor 46 can detect that given network access message 92 whose destination is a given computing device 22 on network 26 based on port number 100 (i.e., the destination port in the given transmission). In this embodiment, processor 46 can determine the device role of the given computing device (e.g., a printer) and the message operation (e.g., printing activity) of the given network access message based on the port number in the given network access message.

For example, many printers and printing operations use the line printer daemon (LPD) protocol that uses TCP port 515 (i.e., port number 100 in the given transmission). Since TCP port 15 is typically reserved for LPD printing, a successful transmission 34 from a source device 22 to TCP port 515 on a destination device 22 can indicate that the role of the given destination device is a printer, and that the successful transmission comprises a printing operation.

In a further embodiment, processor 46 can detect that given network access message 92 whose destination is a given computing device 22 on network 24 by detecting that the given network access message comprises a network broadcast message. A given device 22 whose role 42 is a printer can use a protocol such as multicast DNS (mDNS) to transmit, to all the other computing devices on network 26, frequent network access messages 92 that specify its role as a printer, so as to notify the other devices that they can transmit print jobs to the given device.

Network access message 92J. This network access message comprises a given transmission 34 whose respective domain 104 indicates a captive portal request comprising an attempt to access a given domain 58 comprising a captive portal domain. In some embodiments, processor 46 can detect a captive portal request from the CHROME™ browser (produced by ALPHABET Inc., 1600 Amphitheatre Parkway, Mountain View, Calif. 94043, USA) by detecting three random DNS requests in a sequence of transmissions 34 from a given computing device 22.

Network access message 92K. This network access message comprises a given transmission 34 whose respective domain 104 indicates a given domain 58 for a virtual assistant such as MICROSOFT's CORTANA™ and APPLE's SIRI™. In addition to detecting the domains for the virtual assistants, processor 46 can detect and verify a specific sequence of transmissions 34 to these domains in order to confirm that a given computing device 22 is sending a valid virtual assistant request to one of these domains.

Network access message 92L. This network access message comprises a given transmission 34 comprising a request for a given domain (i.e., indicated by domain 104) that was originated by a desktop widget in a given operating system 78 or a given application 80 comprising (e.g., DASHBOARD™ or SPOTLIGHT™ in MACOS™).

Network access message 92M. This network access message comprises a given transmission 34 comprising a request for a given domain (i.e., indicated by domain 104) that was originated by a launching point in a given operating system 78 or a given application 80 comprising (e.g., the "Start" button in WINDOWS™). For example, upon the human operator of a given computing device 22 clicking (i.e., using a given input device 44 such as a mouse) on an operating system button (i.e., presented on the display of the given computing device), the (operating system executing on the) given computing device may request access to a given domain 58 in response to detecting the click on a specific region of the display.

Network access message 92N. This network access message comprises a given transmission 34 that includes a request to download media (e.g., music and video) from a given domain 58 indicated by domain 104 (e.g., SPOTIFY™ or NETFLIX™). In embodiments of the present invention, the request to download the media may comprise a request to live-stream the media.

Network access message 92O. This network access message comprises a given transmission 34 that includes a data synchronization request to a data cloud provider. Processor 46 can identify a data cloud synchronization request based on the domain in the given transmission.

Network access message 92P. This network access message comprises a given transmission 34 that comprises a new access to a popular domain. In some embodiments, a new access may be limited to a specified time threshold (e.g., the domain was not previously accessed during the last hour), and the popularity may comprise a popularity threshold (e.g., the top 1,000 domains 58) that are ranked by a domain ranking service such as ALEXA™, provided by AMAZON.COM, Inc., 410 Terry Avenue North Seattle, Wash. 98109 USA. Processor 46 can identify a request to access a given domain 58 based on the domain in the given transmission.

Network access message 92Q. This network access message comprises a given transmission 34 that includes an identity of a user agent of a given application 80 that originated the given transmission.

Network access message 92R. This network access message comprises a given transmission 34 that includes a request for a favicon from a given domain 58 (i.e., as indicated by domain 104).

Network access message 92S. This network access message comprises a given transmission 34 that includes an indication of a closing or an opening of either a window or a tab in a web browser application executing on a given computing device that originated the given transmission. In one example, processor 46 can detect an opening of a window or a tab in a web browser application executing on a given computing device 22 that originated the given transmission by detecting, in the given transmission, that the application ID references a web browser application (e.g., FIREFOX™ or CHROME™), and detecting a request for a specific domains 58 in the domain ID. In another example, processor 46 can detect a closing of a window or a tab in a web browser application executing on a given computing device 22 that originated the given transmission by detecting, in the given transmission, that the application ID references a web browser application is FIREFOX™, and detecting that the message operation includes telemetry information indicating a closing or an opening of either a window or a tab.

Network access message 92T. This network access message comprises a given transmission 34 that includes a hypertext transfer protocol (HTTP) referrer header. In some embodiments, processor 46 can detect an HTTP referrer header in the domain ID in the given transmission.

Network access message 92U. This network access message comprises a given transmission 34 that indicates Wi-Fi activity such as moving between Wi-Fi networks and joining a new Wi-Fi network. To identify Wi-Fi activity, processor 46 can if the computing device that transmitted the given transmission has a new IP address that was not previously detected in an IP subnet that comprises a Wi-Fi network.

In some embodiments, the network access messages described supra were defined using the following machine learning concepts and tools:

Noisy labels such as time of the day and weekends. When starting their analysis, the inventors did not have many labels, so they used weak classifiers in order to generate the labels. One example of a weak classifier is that is no given human operator 38 for a given computing device during typical non-office hours (e.g., 4:00 am). While this classification rule is not always true, it can be a good starting point for label identification.

Use output from agent-based systems that were able to verify when a given human 38 was operating a given computing device 22. In some configurations, the inventors were able to generate labels based on software applications 80 executing on the computing devices at a time when it was known that there were humans 38 operating the computing devices. While this technique was used to generate multiple accurate labels, these labels were only a subset of the final set.

The inventors were able to bootstrap identified cases in order to identify new indicative behaviors. Bootstrapping enabled the application of general machine learning knowledge or added domain knowledge (e.g., if a given human 38 is operating a given computing device now, the given human is likely to be operating the given computing device ten minutes from now as well).

Aggregate contradicting and non-matching indications.

Additional methods of generating classifiers without having any labeled data are described, for example, in U.S. Patent Application 2019/0164086.

The network access messages described supra may comprise local network access messages 92 that processor 46 can use to identify transmissions 34 to a given computing device 22 on network 26 and web access messages 92 that comprise transmissions 34 that the system processor can use to identify transmissions 34 to a web site 30 (note that the local network access messages and the web access messages are not mutually exclusive). Examples of the network access messages that comprise local network access messages include network access messages 92A-92J. Examples of the network access messages that comprise web network access messages include messages 92B, 92G and 92K-92S.

In some embodiments, the tasks of querying firewall log 64, generating transmission records 90 and comparing the message operations in the transmission records to network access messages 92 may be split among multiple devices within computing facility 20 (e.g., computing devices 22) or external to the computing facility (e.g., a data cloud based application). In some embodiments, the functionality of some or all of computing devices 22 and/or malware detection system may be deployed in computing facility 20 as virtual machines.

Examples of memories 48 and 72 include dynamic random-access memories and non-volatile random-access memories. In some embodiments, the memories may comprise non-volatile storage devices such as hard disk drives and solid-state disk drives.

Processors 46 and 70 comprise general-purpose central processing units (CPU) or special-purpose embedded processors, which are programmed in software or firmware to carry out the functions described herein. This software may be downloaded to computing devices 22 and malware detection system 24 in electronic form, over a network, for example. Additionally or alternatively, the software may be stored on tangible, non-transitory computer-readable media, such as optical, magnetic, or electronic memory media. Further additionally or alternatively, at least some of the functions of processors 46 and 70 may be carried out by hard-wired or programmable digital logic circuits.

Human Activity Detection

Figure 4:
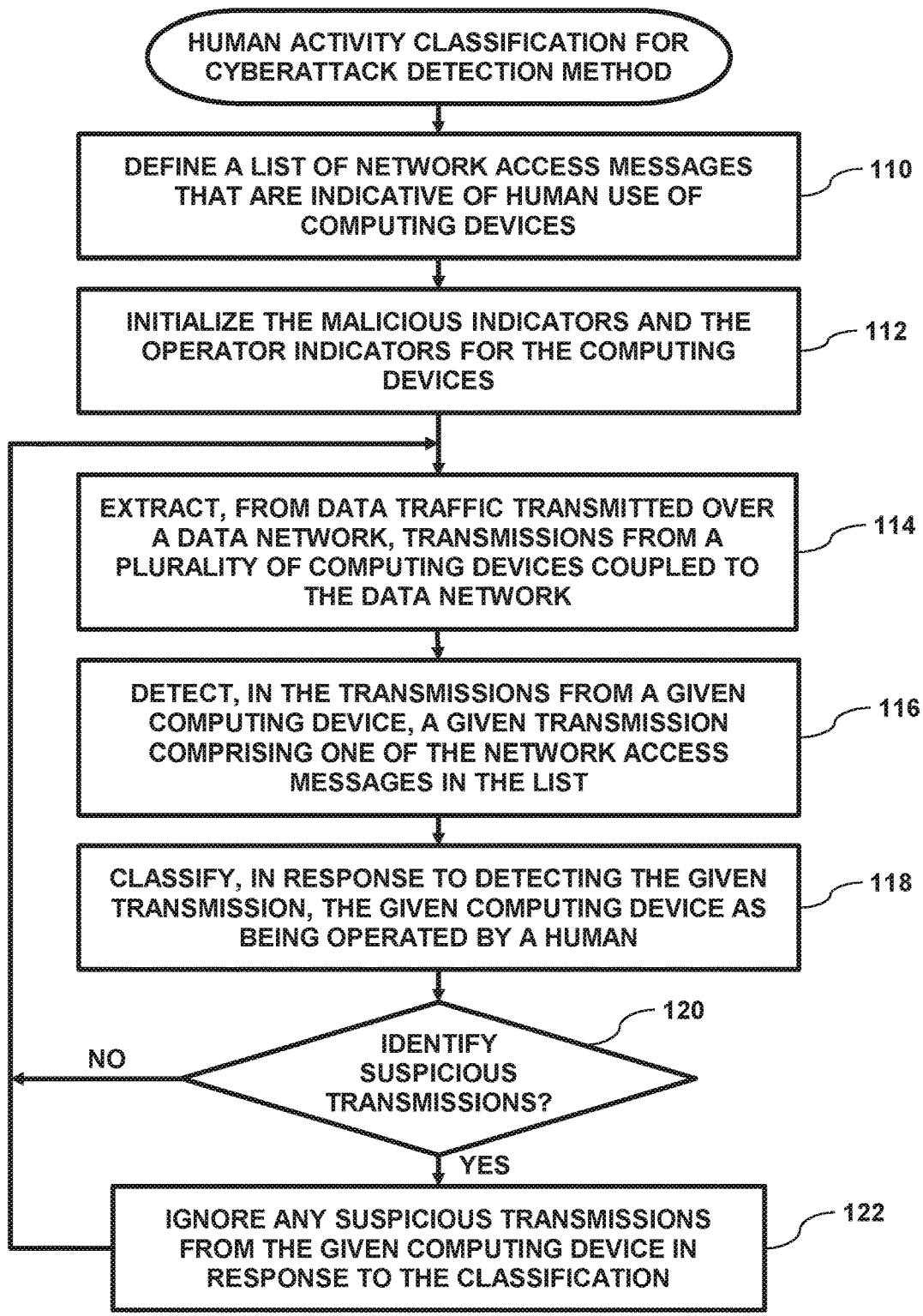
FIG. 4 is a flow diagram that schematically illustrates a method of human activity classification, in accordance with an embodiment of the present invention.

FIG. 4 is a flow diagram that schematically illustrates a method of analyzing transmissions 34 so as to classify a given computing device 22 as being operated by a given human 38, in accordance with an embodiment of the present invention. As described supra, each transmission record 90 corresponds to a given transmission 34. Therefore, in embodiments described hereinbelow, processor 46 analyzes transmissions 34 by analyzing the corresponding transmission records 90 that processor 46 can retrieve from log 64.

In a definition step 110, a list of network access messages 92 are defined. As described supra, the network access messages comprise network access messages 92A-92U.

In an initialization step 112, processor 46 initializes malicious classifications 82 and operator classifications 84. For example, processor 46 can initialize malicious classifications 82 to indicate that the computing devices are not engaged in malicious activity, and initialize operator classification 84 to indicate that the computing devices do not have respective human operators 38.

In an extraction step 114, processor 70 communicates with NIC 50 to extract, from data traffic comprising data packets transmitted from a plurality of computing devices 22 on network 26, respective sets of transmissions 34. In embodiments of the present invention, each of the transmissions is either from a first given computing device 22 to a second given computing device 22 or from a given computing device 22 to a given web site 30.

In some embodiments, processor 46 can filter out any contradicting events in transmissions 34. Contradicting events can be caused by a delay in data ingestion where there is a lag in updating log 64. In one example, processor 46 detects a given transmission from a given computing device after detecting that the given computing device has logged out of network 26. In another example, processor 46 detects, by analyzing log 64, that a given computing device was turned on at a given time, but the system processor detects that the given computing device accessed many domains 58 with large volumes of traffic prior to the given time. Although this seems contradictory (i.e., since large volumes traffic can indicate that there is a given human 38 behind the keyboard and that the given computing device was turned on), one explanation for this can be that automatic updates were performed during nighttime hours when there was no human 38 at the keyboard.

In a detection step 116, processor 46 detects in the transmissions from a given computing device 22, a given transmission whose respective operation 108 matches a given network access message 92, and in a classification step 118, in response to detecting the given transmission, the system processor classifies the given computing device as being operated by a given human 38, and stores the classification to the operator indicator for the given computing device.

In alternative embodiments, processor 46 can perform the classification in step 116 based on features not included in web access messages 92. In a first alternative embodiment, during a specified time period (e.g., the last 10 minutes), processor 46 can gather, from the transmissions from a given computing device 22, perform the classification (i.e., whether or not there is a given human operator 38) based on information such as:

- A number of unique domains 58 that were accessed. For example, if the given computing device accesses more than a specified number (e.g., ten) of different domains 58 during a short period of time (e.g., 10 minutes), then processor 46 can classify the given computing device as having a given human operator 38.
- A number of unique top-level domains (i.e., in domains 58) that were accessed. For example, if the given computing device accessed more than a specified number (e.g., three) different top-level domains 58 (e.g., ".com", ".net", ".co.il") during a specified time period (e.g., 10 minutes), then processor 46 can classify the given computing device as having a given human operator 38.
- A number of data packets 36 that were transmitted to the unique domains. For example, if the given computing device transmits more than a first specified number (e.g., 100) of data packets 36 to a second specified number (e.g., 3) of domains 58 during a specified time period (e.g., 10 minutes), then processor 46 can classify the given computing device as having a given human operator 38.
- A total amount (i.e., a number of bytes) of network traffic (i.e., in data packets 36) that were transmitted to and received from domains 58. For example, if the given computing device transmitted and/or received a specified amount (e.g., 20 megabytes) of data traffic from any given domain 58 during a specified time period (e.g., 10 minutes), then processor 46 can classify the given computing device as having a given human operator 38.
- An average amount (i.e., a number of bytes) of network traffic (i.e., in data packets 36) that were transmitted to and/or received from a given domain 58. To compute this average amount, processor 46 identifies any of the computing devices that transmitted transmissions 36 to a given domain 58, determines the sizes of the transmissions, and computes the average by dividing the total of the sizes by the number of network traffic sessions between the given computing device and the given domain. For example, if the average amount of network traffic (i.e., total size of data packets 36) to a given domain 58 is greater than a specified amount (e.g., 5 megabytes per session) during a specified time period (e.g., 10 minutes), then processor 46 can classify the given computing device as having a given human operator 38.
- A session typically comprises a series of "back and forth" transmissions between a given computing device 22 and a given domain 58 that perform a specific task. For example, a given session may comprise a given computing device 22 uploading a file to a given domain 58 (e.g., a data cloud server). To upload the file, the given computing device typically transmits multiple transmissions 34 to the given domain, and the given domain transmits respective acknowledgments (i.e., an additional transmission 34) to the given computing device in response to receiving each of the transmissions. In some embodiments, processor 46 can identify a given session by identifying, within a specified time period, a series of transmissions 34 that are from a given computing device 22 to a given domain 58 and have the same port number 100.

A maximum amount (i.e., a number of bytes) of network traffic (i.e., in data packets 36) that were transmitted to and received from a given domain 58. For example, if the given computing devices downloaded more than 100 kilobytes of data from a given domain 58 during a specified time period (e.g., 10 minutes), then processor can classify the given computing device as having a given human operator 38.

In a second alternative embodiment, processor 46 can identify, in the transmissions from a given computing device 22, multiple domain name system (DNS) requests having respective DNS request types, and perform the classification (i.e., whether or not there is a given human operator 38) based on a number of each type of DNS request. For example, if processor 46 detects that a given computing device 22 generates more than ten DNS requests that are "A type" DNS requests or detects that the given computing device generates more than five DNS requests that are "TXT type" DNS requests, then the than 100 KB of data from a given domain 58"), processor 46 can classify the given computing device as having a given human operator 38.

If there is a previous operator classification 84 for the given computing device, processor 46 can use the current classification (i.e., the classification in step 118) to update the previous classification. In embodiments where the classifications are performed in specific time period intervals (e.g., 10 minutes), the transmissions from the given computer during a previous time period can help strengthen or weaken the current classification. For example, if a first given transmission 34 during a first time period and a second given transmission 34 during the second time period following the first time both indicate that the given computing device was streaming (i.e., downloading) media (i.e., as described supra in network access message 92N), the classification of the given computing device can be strengthened, since there is a higher probability of a given human operator 38 (i.e., due to the continued media streaming).

In a decision step 120, if processor 46 identifies any suspicious content in transmissions 34 from a subset of computing devices 22 that include the given computing device, then in an ignore step 122, the processor ignores, in response to the classification, any of the transmissions from the given computing device that includes the suspicious content, and the method continues with step 112. Returning to step 122, processor 46 does not identify any suspicious content in transmissions 34 from a subset of computing devices 22 that include the given computing device, then the method continues with step 112.

However, if processor identifies any suspicious content in the transmissions from one of the computing devices 22 that was not classified as having a given human operator 38, then the system processor can initiate a protective action for the identified computing device (i.e., the one of the computing devices that was not classified as having a given human operator 38). The protective action may comprise presenting a notification on UI device 52, or conveying a message to firewall 56 to block any further transmissions 34 from the identified computing device.

While the description referencing FIG. 4 describes processor 46 performing steps 110-122, other configurations are considered to be within the spirit and scope of the present invention. For example, the steps can be performed by any combination of processor 46, any other processors in computing facility 20, or a data cloud (not shown).

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for protecting a computing device, comprising:
   defining a list of network access messages that are indicative of human use of any of a plurality of computing devices;
   extracting, from data traffic transmitted over a data network connecting the computing devices to multiple Internet sites during a first time period, respective transmissions from the computing devices to the Internet sites;
   detecting, in the transmissions from a given computing device, a given transmission comprising one of the network access messages in the list;
   classifying, in response to detecting the given transmission, the given computing device as being operated by a human;
   identifying, by a processor, suspicious content in the transmissions from a subset of the computing devices that includes the given computing device;
   extracting, from additional data traffic transmitted over the data network during a second time period subsequent to the first time period, respective transmissions from the computing devices to the Internet sites;
   detecting, in the transmissions during the subsequent time period from the given computing device, a subsequent transmission comprising one of the network access messages in the list;
   updating the classification in response to detecting the subsequent transmission; and
   ignoring any suspicious transmissions from the given computing device in response to the updated classification.

2. The method according to claim 1, wherein the given computing device comprises a first given computing device, and the method comprising initiating a protective action for a second given computing device different from the first given computing device and in the subset of the computing devices.

3. The method according to claim 1, wherein a given network access message comprises a user login request.

4. The method according to claim 3, wherein the user login request comprises a user authentication request.

5. The method according to claim 1, wherein a given network access message comprises a backup operation.

6. The method according to claim 1, wherein a given network access message comprises a screen sharing operation.

7. The method according to claim 1, wherein a given network access message comprises a network indexing operation.

8. The method according to claim 1, wherein the given computing device comprises a first given computing device and wherein a given network access message comprises a transmission to a software application executing on a second given computing device.

9. The method according to claim 1, wherein a given network access message comprises a request for an IP address.

10. The method according to claim 1, wherein a given network access message comprises a remote shell protocol.

11. The method according to claim 1, wherein the given computing device comprises a first given computing device and wherein a given network access message comprises a transmission to a second given computing device.

12. The method according to claim 1, wherein a given network access message comprises a request to access a captive portal domain.

13. The method according to claim 1, wherein a given network access message comprises a domain request from a virtual assistant application executing on the given computing device.

14. The method according to claim 1, wherein a given network access message comprises a domain request from a desktop widget of an operating system.

15. The method according to claim 1, wherein a given network access message comprises a domain request originating from a launching point.

16. The method according to claim 1, wherein a given network access message comprises a media download or a live-stream request.

17. The method according to claim 1, wherein a given network access message comprises a data synchronization request to a data cloud.

18. The method according to claim 1, wherein a given network access message comprises a new access to a given domain whose popularity exceeds a specified threshold.

19. The method according to claim 1, wherein a given network access message comprises user agent information.

20. The method according to claim 1, wherein a given network access message comprises a favicon request.

21. The method according to claim 1, wherein a given network access message comprises an indication that a new tab or window was opened or closed in a web browser executing on the given computing device.

22. The method according to claim 1, wherein a given network access message comprises an HTTP referrer header.

23. The method according to claim 1, wherein the transmissions comprise domain name system (DNS) requests having different DNS request types, and the method comprising determining a number of a given DNS request type in the transmissions from one of the computing devices to a domain, and classifying, based on the determined number, the one of the computing devices as being operated by a human.

24. The method according to claim 1, and the method comprising computing statistics on the web access messages from one of the computing devices to a domain, and classifying, based on the computed statistics, the one of the computing devices as being operated by a human.

25. The method according to claim 1, wherein a given network access message comprises a printing operation.

26. The method according to claim 1, wherein a given network access message comprises Wi-Fi activity.

27. An apparatus for protecting a computing device, comprising:
a network interface card (NIC); and
at least one processor configured:
to define a list of network access messages that are indicative of human use of any of a plurality of computing devices,
to extract, via the NIC from data traffic transmitted over a data network connecting the computing devices to multiple Internet sites during a first time period, respective transmissions from the computing devices to the Internet sites,
to detect, in the transmissions from a given computing device, a given transmission comprising one of the network access messages in the list,
to classify, in response to detecting the given transmission, the given computing device as being operated by a human,
to identify suspicious content in the transmissions from a subset of the computing devices that includes the given computing device,
to extract, from additional data traffic transmitted over the data network during a second time period subsequent to the first time period, respective transmissions from the computing devices to the Internet sites,
to detect, in the transmissions during the subsequent time period from the given computing device, a subsequent transmission comprising one of the network access messages in the list,
to update the classification in response to detecting the subsequent transmission, and
to ignore any suspicious transmissions from the given computing device in response to the updated classification.

28. A computer software product for protecting a computing system, the product comprising a non-transitory computer-readable medium, in which program instructions are stored, which instructions, when read by a computer, cause the computer:
to define a list of network access messages that are indicative of human use of any of a plurality of computing devices;
to extract, from data traffic transmitted over a data network connecting the computing devices to multiple Internet sites during a first time period, respective transmissions from the computing devices to the Internet sites;
to detect, in the transmissions from a given computing device, a given transmission comprising one of the network access messages in the list;
to classify, in response to detecting the given transmission, the given computing device as being operated by a human;
to identify suspicious content in the transmissions from a subset of the computing devices that includes the given computing device;
to extract, from additional data traffic transmitted over the data network during a second time period subsequent to the first time period, respective transmissions from the computing devices to the Internet sites;
to detect, in the transmissions during the subsequent time period from the given computing device, a subsequent transmission comprising one of the network access messages in the list;
to update the classification in response to detecting the subsequent transmission; and
to ignore any suspicious transmissions from the given computing device in response to the updated classification.

* * * * *